United States Patent
Balthes et al.

(10) Patent No.: US 11,053,832 B2
(45) Date of Patent: Jul. 6, 2021

(54) METHOD FOR OPERATING AN EXHAUST SYSTEM, IN PARTICULAR OF A MOTOR VEHICLE

(71) Applicant: Daimler AG, Stuttgart (DE)

(72) Inventors: Ortwin Balthes, Sachsenheim (DE); Berthold Keppeler, Owen (DE); Siegfried Mueller, Ingersheim (DE); Thorsten Woog, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/766,482

(22) PCT Filed: Nov. 16, 2018

(86) PCT No.: PCT/EP2018/081533
§ 371 (c)(1),
(2) Date: May 22, 2020

(87) PCT Pub. No.: WO2019/101639
PCT Pub. Date: May 31, 2019

(65) Prior Publication Data
US 2020/0378287 A1    Dec. 3, 2020

(30) Foreign Application Priority Data
Nov. 23, 2017   (DE) ............... 10 2017 010 825.0

(51) Int. Cl.
*F01N 3/20*   (2006.01)
*F01N 13/00*  (2010.01)
(Continued)

(52) U.S. Cl.
CPC ......... *F01N 3/208* (2013.01); *B01D 53/9418* (2013.01); *B01D 53/9431* (2013.01);
(Continued)

(58) Field of Classification Search
CPC combination set(s) only.
See application file for complete search history.

(56) References Cited

U.S. PATENT DOCUMENTS

| 8,516,798 | B2  |   | 8/2013 | Dobson et al. |
| 8,646,259 | B2 | * | 2/2014 | Gonze ............. F01N 3/2013 60/301 |

(Continued)

FOREIGN PATENT DOCUMENTS

| DE | 10 2010 032 544 A1 | 2/2011 |
| DE | 10 2013 203 580 A1 | 9/2014 |

(Continued)

OTHER PUBLICATIONS

PCT/EP2018/081533, International Search Report dated Jan. 17, 2019 (Three (3) pages).

(Continued)

*Primary Examiner* — Binh Q Tran
(74) *Attorney, Agent, or Firm* — Crowell & Moring LLP

(57) ABSTRACT

A method for operating an exhaust system, where the exhaust system has a first selective catalytic reduction (SCR) catalytic converter close to the engine and a second SCR catalytic converter arranged downstream of the first. A respective quantity of reducing agent to be introduced into the exhaust gas by a respective dosing element is set depending on a first temperature of the first SCR catalytic converter, where during a period of time during which the first temperature exceeds a predeterminable first threshold value and a second temperature of the second SCR catalytic converter exceeds a predeterminable second threshold value, which is lower than the first threshold value, the introduction of the reducing agent into the exhaust gas with regard to the dosing elements takes place exclusively via the second dosing element such that during the period of time, no (Continued)

introduction of the reducing agent into the exhaust gas takes place.

7 Claims, 1 Drawing Sheet

(51) Int. Cl.
*B01D 53/94* (2006.01)
*F01N 3/10* (2006.01)
*F01N 11/00* (2006.01)
*F01N 9/00* (2006.01)

(52) U.S. Cl.
CPC ......... *F01N 3/105* (2013.01); *F01N 13/009* (2014.06); *F01N 9/005* (2013.01); *F01N 11/002* (2013.01); *F01N 11/005* (2013.01); *F01N 2560/06* (2013.01); *F01N 2610/02* (2013.01); *F01N 2610/1453* (2013.01); *F01N 2900/0422* (2013.01); *F01N 2900/1411* (2013.01); *F01N 2900/1602* (2013.01)

(56) References Cited

U.S. PATENT DOCUMENTS

| | | | |
|---|---|---|---|
| 9,162,183 B2 * | 10/2015 | Ancimer | F01N 3/035 |
| 9,976,462 B2 * | 5/2018 | Lutz | B01D 46/006 |
| 10,487,713 B2 * | 11/2019 | Umemoto | B01D 53/9431 |
| 2005/0069476 A1 | 3/2005 | Blakeman et al. | |
| 2015/0052878 A1 * | 2/2015 | Qi | F01N 3/208 60/277 |
| 2015/0275730 A1 | 10/2015 | Gupta et al. | |
| 2017/0043295 A1 * | 2/2017 | Minezawa | F01N 3/08 |
| 2017/0051654 A1 * | 2/2017 | Gupta | F01N 3/035 |
| 2017/0130628 A1 | 5/2017 | Franz et al. | |

FOREIGN PATENT DOCUMENTS

| | | |
|---|---|---|
| DE | 10 2015 000 955 A1 | 7/2015 |
| DE | 10 2015 012 736 A1 | 4/2017 |
| WO | WO 2013/178435 A1 | 12/2013 |
| WO | WO 2014/016616 A1 | 1/2014 |
| WO | WO 2015/130211 A1 | 9/2015 |
| WO | WO 2016/008758 A1 | 1/2016 |

OTHER PUBLICATIONS

German Search Report issued in German application No. 10 2017 010 825.0 dated Aug. 30, 2018, with Statement of Relevancy (Eleven (11) pages).

* cited by examiner

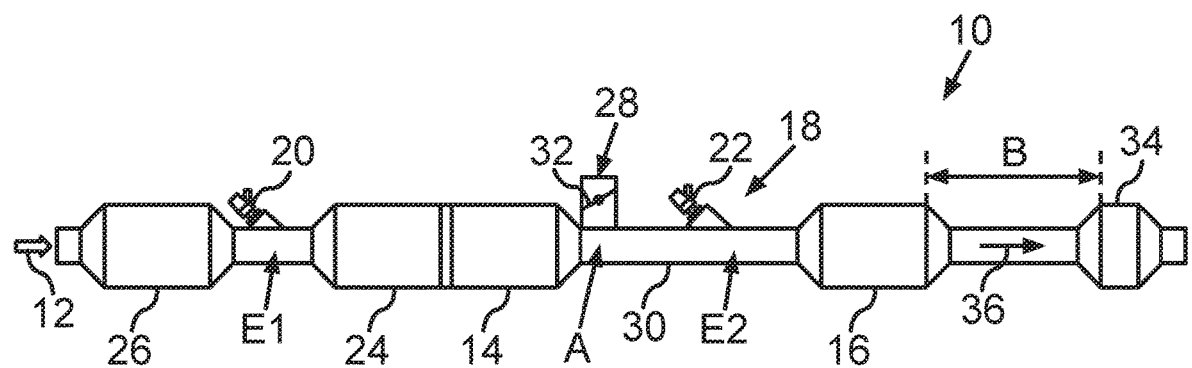

METHOD FOR OPERATING AN EXHAUST SYSTEM, IN PARTICULAR OF A MOTOR VEHICLE

BACKGROUND AND SUMMARY OF THE INVENTION

The invention relates to a method for operating an exhaust system, in particular of a motor vehicle.

Such a method for operating an exhaust system through which exhaust gas of an internal combustion engine, in particular of a motor vehicle, can flow is already known from DE 10 2015 000 955 A1, for example. The exhaust system has a first SCR catalytic converter and a second SCR catalytic converter, which is arranged downstream of the first SCR catalytic converter in the direction of flow of the exhaust gas flowing through the exhaust system. The respective SCR catalytic converter has at least one coating which is catalytically effective for selective catalytic reduction (SCR), such that the respective SCR catalytic converter catalytically supports or effects selective catalytic reduction (SCR). This means that the SCR can take place in the respective SCR catalytic converter, in the scope of which any nitrogen oxides ($NO_x$) contained in the exhaust gas react with ammonia, which originates from a reducing agent that was or is introduced into the exhaust gas, to form nitrogen and water. In this way, any nitrogen oxides contained in the exhaust gas are at least partially removed from the exhaust gas, which is also referred to as denitrification of the exhaust gas.

The exhaust system further comprises a first dosing element, by means of which the reducing agent can be introduced into the exhaust gas at at least one first introduction point. The first introduction point is arranged upstream of the first SCR catalytic converter and thus also upstream of the second SCR catalytic converter. Furthermore, the exhaust system comprises a second dosing element, by means of which the reducing agent can be introduced into the exhaust gas at a second introduction point. The second introduction point is arranged downstream of the first SCR catalytic converter and upstream of the second SCR catalytic converter.

Furthermore, WO 2013/178435 A1 discloses a method for operating a reducing agent dosing system of an SCR catalytic converter system of an internal combustion engine. WO 2016/008758A1 also discloses a method for operating a reducing agent dosing system of an SCR catalytic converter system. Furthermore, a method for controlling an emission control system of a vehicle is known from DE 10 2010 032 544 A1, having a first SCR region and a second SCR region, which is arranged downstream of the first SCR region.

The object of the present invention is to develop a method of the type mentioned above in such a way that a low-emission operation can be implemented.

In order to further develop a method of the type specified herein in such a way that a particularly low-emission operation can be implemented, it is provided in accordance with the invention that a respective quantity of the reducing agent to be introduced into the exhaust gas by means of the respective dosing element is set depending on at least a first temperature of the first SCR catalytic converter. The first temperature is, for example, a temperature prevailing in the SCR catalytic converter, in particular, the exhaust gas flowing through the SCR catalytic converter. In the method, during a time period in which the first temperature exceeds a predeterminable or predetermined first threshold value and at least a second temperature of the second SCR catalytic converter exceeds a predeterminable or predetermined second threshold value which is lower than the first threshold value, the reducing agent is introduced into the exhaust gas exclusively via the second dosing element with respect to the dosing elements, such that, during the time period, the reducing agent is not introduced into the exhaust gas by means of the first dosing element. This means that during the period of time, an introduction of the reducing agent into the exhaust gas takes place, wherein the reducing agent is introduced into the exhaust gas by means of the second dosing element and not by means of the first dosing element.

The period of time during which the reducing agent is introduced into the exhaust gas is understood in particular to mean a supply of the exhaust gas with the reducing agent, wherein the period of time comprises, for example, several successive introduction processes spaced apart in time, in or during which the reducing agent is actually introduced into the exhaust gas, in particular injected. Between the introduction processes, there are, for example, time intervals in which an introduction or injection of the reducing agent into the exhaust gas is not carried out, wherein the time intervals, however, belong to the timespan.

In the respective introduction process, a predeterminable or predetermined total quantity of the reducing agent is introduced into the exhaust gas, wherein during the period of time, however, the respective total quantity which is introduced into the exhaust gas during the respective introduction process is distributed or divided among the dosing elements in such a way that the total quantity in relation to the dosing elements is introduced into the exhaust gas exclusively by means of the second dosing element and not by means of the first dosing element. The quantity which is introduced into the exhaust gas by means of the second dosing element during the respective introduction process thus corresponds to the total quantity, while an introduction of reducing agent into the exhaust gas effected by the first dosing element is omitted or while the quantity of reducing agent which is introduced into the exhaust gas during the respective introduction process is 0. Here, the total quantity is greater than 0.

The invention is based on the idea of providing, for example, an alternating operation of the dosing elements and thus, for example, of the SCR catalytic converters in order to distribute, for example, one or the total quantity of the reducing agent which is to be introduced into the exhaust gas in the course of an introduction process to the dosing elements and, in doing so, to vary this distribution of the total quantity to the dosing elements, in particular depending on the temperature and, if necessary, depending on the exhaust gas mass flow. By way of example, depending on the temperature and, if applicable, the exhaust gas mass flow, only the first dosing element, only the second dosing element or both dosing elements are used to introduce the reducing agent into the exhaust gas and thus to denitrify the exhaust gas and, for example, to use the SCR catalytic converters as required. At high temperatures or during the above-mentioned period of time, reducing agent is mainly or completely introduced into the exhaust gas via the second dosing element. At temperatures which are lower in comparison, for example, reducing agent is introduced into the exhaust gas via both dosing elements or only via the first dosing element. This allows temperature windows to be used which are advantageous for the denitrification of the exhaust gas. The distribution of the total quantity to the dosing elements can be carried out depending on various factors such as ageing of the respective SCR catalytic converter, at least one or more temperatures, exhaust gas mass flow, load range, operating mode etc. The first SCR catalytic converter is, for example, a catalytic converter close to the engine, which is arranged closer to the internal combustion engine in the flow direction of the exhaust gas flowing through the exhaust system than the second SCR catalytic converter. In the completed state of a motor vehicle comprising the internal combustion engine and the exhaust system and designed, for example, as a motor vehicle, in particular a passenger car, for example, the internal combustion engine and the first SCR catalytic converter are arranged together in an engine compartment. Since the first SCR catalytic converter is arranged particularly close to the internal combustion engine, the SCR catalytic converter can be heated up particularly quickly and thus reach a temperature range in which the SCR catalytic converter can particularly advantageously denitrify the exhaust gas.

The second SCR catalytic converter is, for example, a so-called underbody catalytic converter, which is located, for example, in the region of or below an underbody of the motor vehicle. The underbody of the motor vehicle is formed, for example, by a body of the motor vehicle designed in particular as a self-supporting body. The invention is based in particular on the following finding: in order to achieve sufficient nitrogen oxide conversion as quickly as possible, i.e, for example shortly after a cold start of the internal combustion engine, a sufficient nitrogen oxide transformation and thus a sufficient denitrification of the exhaust gas in the exhaust system, an attempt is made to position the first SCR catalytic converter as close as possible to the engine.

Within the scope of the invention, an SCR catalytic converter or the respective SCR catalytic converter is understood to mean that the SCR catalytic converter has at least one catalytic or catalytically active coating which is catalytically active for selective catalytic reduction (SCR). Thus, the respective SCR catalytic converter can catalytically effect or support the SCR, such that, for example, the selective catalytic reduction can take place or occur in the respective SCR catalytic converter. Within the scope of selective catalytic reduction (SCR), any nitrogen oxides possibly contained in the exhaust gas are converted into nitrogen and water using ammonia, which originates from the reducing agent that is or was introduced into the exhaust gas. In other words, the nitrogen oxides possibly contained in the exhaust gas react with the ammonia from the reducing agent to form nitrogen and water within the scope of the SCR, such that the nitrogen oxides possibly contained in the exhaust gas are at least partially removed from the exhaust gas. This is also referred to as denitrification of the exhaust gas. The first SCR catalytic converter can, for example, be a particulate filter, in particular a diesel particulate filter (DPF), with a coating that is catalytically effective for SCR or be formed by such a particulate filter.

However, the arrangement of the first SCR catalytic converter close to the engine can be disadvantageous in that at very high temperatures, in particular of the exhaust gas or of the first SCR catalytic converter, a reduced nitrogen oxide conversion behavior of the first SCR catalytic converter can occur, in particular compared to lower temperatures. To partially compensate for this reduction in nitrogen oxide conversion behavior, for example, an excess of reducing agent can be introduced into the exhaust gas. Such an excess of the reducing agent is to be understood to mean that a higher quantity of reducing agent is introduced into the exhaust gas than is necessary to denitrify the exhaust gas. This, however, increases the consumption of reducing agent very sharply on the one hand, and on the other hand, a complete nitrogen oxide conversion cannot be achieved. In addition, the selectivity of the SCR deteriorates at higher temperatures of, for example, more than 400 degrees Celsius, and nitrous oxide ($N_2O$) and $NO_x$ are increasingly formed. At very high $NO_x$ raw emission levels, an increasingly high quantity of reducing agent is required. The processing of large quantities of reducing agent is difficult to ensure at only one injection point, also referred to as the dosing point. The treatment of the reducing agent is to be understood as an evaporation or a conversion of the reducing agent into ammonia, whereby the ammonia is provided. As a consequence, the raw $NO_x$ emission would have to be lowered in such situations. However, this means increased fuel consumption of the combustion engine and increased particulate emissions. In this respect, there is a conflict of objectives between the desire to keep nitrogen oxide emissions particularly low and the desire to keep the fuel consumption and the particulate emissions in a particularly low framework.

A further challenge for the SCR catalytic converter close to the engine is the desired operation with the highest possible exhaust gas recirculation rate (EGR rate), in particular with low-pressure exhaust gas recirculation. A high exhaust gas recirculation rate, in particular a high low-pressure exhaust gas recirculation rate, increases the probability or risk that a slip quantity of reducing agent will be recirculated via an exhaust gas recirculation path into the internal combustion engine, in particular into at least one combustion chamber if the internal combustion engine designed as a cylinder, for example. The slip quantity of the reducing agent is to be understood to be an ammonia slip ($NH_3$ slip). In other words, the slip quantity refers to reducing agent which has passed through the respective SCR catalytic converter without participating in the SCR, i.e, without being used. Such recirculation of unused reducing agent into the internal combustion engine increases the risk of corrosion of affected components, and unused reducing agent is at least partially converted into nitrogen oxide and/or nitrous oxide. In addition, at high exhaust gas recirculation rates, space velocity increases at the position close to the engine and the nitrogen oxide conversion becomes worse.

The problems and disadvantages mentioned above can be counteracted by using the second SCR catalytic converter and the second injection point or the second dosing element. It has been shown to be advantageous if, at or in the rated power point of the internal combustion engine, a difference between the first temperature and the second temperature is at least 50 degrees Celsius, preferably at least 100 degrees Celsius. This means that if, for example, the first SCR catalytic converter is unable to effect any or only a slight conversion of nitrogen oxide, the second SCR catalytic converter can be operated at least substantially optimally, or the second SCR catalytic converter can be used to ensure at least substantially optimal nitrogen oxide conversion or nitrogen oxide transformation, such that overall the nitrogen oxide emissions can be kept particularly low. With the difference described above, the second SCR catalytic converter can have optimum temperature conditions for nitrogen oxide conversion, while the SCR catalytic converter close to the engine is actually too hot for nitrogen oxide conversion.

Here, the advantage of using the second dosing element is that, in particular if the first SCR catalytic converter is unable to effect nitrogen oxide conversion or can do so only very slightly, the second SCR catalytic converter can be supplied with a particularly advantageous or sufficient quantity of reducing agent via the second dosing element, in particular when the first SCR catalytic converter is bypassed. Bypassing the first SCR catalytic converter in particular means that the reducing agent which is introduced, in particular injected, into the exhaust gas by means of the second dosing element at the second introduction point does not flow through the first SCR catalytic converter before it flows through the second SCR catalytic converter. By using the two SCR catalytic converters and the two dosing elements, in particular in combination with a correspondingly optimised operating strategy, it is always possible to achieve at least virtually optimum nitrogen oxide conversion with minimum reducing agent consumption and reduced $N_2O$ emissions. In other words, it is possible to keep nitrous oxide emissions particularly low, to denitrify the exhaust gas particularly advantageously and to thus keep the consumption of the reducing agent particularly low.

By way of example, a distribution of the total quantity to the dosing elements is always based on the respective prevailing conditions. This comprises, for example, the respective temperatures of the SCR catalytic converters, a quantity of the reducing agent accommodated in a tank designed for storing the reducing agent and also referred to as the filling level, the space velocity and/or a capacity with regard to quantities of reducing agent to be processed.

In an advantageous design of the invention, the second temperature is lower than the first threshold value during the period of time. Due to this condition for the introduction of the reducing agent into the exhaust gas, a particularly advantageous nitrogen oxide conversion can be guaranteed.

It has proved to be particularly advantageous if the first threshold value is 450 degrees Celsius.

It has also proved to be particularly advantageous if the second threshold value is 250 degrees Celsius. These designs are based in particular on the realization that a particularly advantageous nitrogen oxide conversion takes place in a temperature range of from 250 degrees Celsius to 450 degrees Celsius inclusive. A further realization is that the consumption of the reducing agent is lower at high exhaust gas recirculation rates at the second SCR catalytic converter due to the lower exhaust gas mass flow, in particular at the same nitrogen oxide concentration.

Furthermore, it is conceivable that the SCR catalytic converters are based on different catalytic converter technologies or use different catalytic converter technologies. By way of example, the first SCR catalytic converter has a lower starting temperature and, in particular, a lower starting temperature than the second SCR catalytic converter. In addition, the first SCR catalytic converter has a greater temperature stability than the second SCR catalytic converter, for example. The first SCR catalytic converter is, for example, temperature-stable up to 900 degrees Celsius. The second SCR catalytic converter is, for example, temperature stable up to 650 degrees Celsius. It is also conceivable that the second SCR catalytic converter has its maximum performance with regard to the conversion or nitrogen oxides in a temperature range from 300 degrees Celsius up to 600 degrees Celsius inclusive.

It has also proved to be particularly advantageous if the introduction of the reducing agent into the exhaust gas and, in particular, the distribution of the total quantity to the dosing elements takes place depending on the exhaust gas, in particular its mass flow. A further condition has been shown to be advantageous if the mass flow of the exhaust gas falls below a predeterminable third threshold value during this period of time.

In order to be able to implement, for example, a particularly low-emission operation, it is provided in a further design of the invention that during a second period of time, during which the first temperature exceeds the first threshold value, the second temperature exceeds the second threshold value and the mass flow of the exhaust gas, however, exceeds the third threshold value, the introduction of reducing agent into the exhaust gas takes place via both dosing elements. In other words, when the mass flow of the exhaust gas exceeds the third threshold value, it is preferably provided that, irrespective of the temperatures of the SCR catalytic converters, the reducing agent is introduced into the exhaust gas via both dosing elements, also referred to as dosing device, in particular when the temperatures of the SCR catalytic converters are greater than a fifth threshold value. The fifth threshold value is 200 degrees Celsius, for example.

In another embodiment of the invention, during a third period of time, during which the first temperature exceeds a predeterminable fourth threshold value which is lower than the first threshold value and falls below the first threshold value, and the second temperature falls below the second threshold value, the reducing agent is introduced into the exhaust gas via both dosing elements. The fourth threshold value is 400 degrees Celsius, for example.

It has proved to be particularly advantageous if, during the third period of time, the quantity introduced into the exhaust gas by means of the first dosing element is greater than the quantity introduced into the exhaust gas by means of the second dosing element. This means that, although reducing agents are introduced into the exhaust gas at both introduction points, a larger quantity of reducing agent is introduced at the first introduction point than at the second introduction point, in particular in a transitional region, in particular in the course of the respective introduction process.

In order to be able to implement a particularly low-emission operation, for example, a ratio of the quantity introduced into the exhaust gas by the first dosing element to the quantity introduced into the exhaust gas by the second dosing element is in the range of 70/30 or 7/3 up to 80/20 or 8/2 inclusive.

Finally, it has been shown to be particularly advantageous if, during a fourth period of time during which the first temperature falls below the first threshold value, in particular the fourth threshold value, and the second temperature exceeds the second threshold value, the introduction of the reducing agent into the exhaust gas takes place via both dosing elements, wherein, during the fourth period of time, the quantity introduced into the exhaust gas by means of the first dosing element is less than the quantity introduced into the exhaust gas by means of the second dosing element. Here, for example, a ratio of the quantity which is introduced into the exhaust gas by means of the second dosing element to the quantity which is introduced into the exhaust gas by means of the first dosing element, in particular in a transition region, is in a range of 7/3 to 8/2 inclusive.

Furthermore, dosing requirements for component protection are conceivable, wherein these dosing requirements can be activated independently of the respective operating modes. In the case of such a dosing requirement, for example, reducing agent is introduced into the exhaust gas in order to cool components of the exhaust system, in particular the introduction device itself, by means of the reducing agent introduced into the exhaust gas.

During the respective time periods, the exhaust system is operated in the respective operating modes. In other words, the respective time period corresponds to a respective operating mode of the respective exhaust system. For example, since at least the four time periods described are provided, the exhaust system can be operated in the corresponding four operating modes.

A fifth operating mode is set, for example, during a fifth time period during which the first temperature falls below the first threshold value, in particular the fourth threshold value, and the second temperature falls below the second threshold value. During the fifth time period of during the fifth operating mode or in the fifth operating mode, for example, the reducing agent is introduced into the exhaust gas with respect to the dosing elements exclusively via the first dosing element.

Since different operating modes are thereby provided, it is possible to switch between the operating modes within the framework of an appropriate operation strategy and thus to switch from one of the operating modes to another of the operating modes. Such a transition from one of the operating modes to another of the operating modes is preferably carried out via a ramp or digitally. By way of example, in order to avoid an excessive temperature of the respective SCR catalytic converter, a heat exchanger device may be provided at least before one of the SCR catalytic converters or before both SCR catalytic converters. Alternatively, at least one of the SCR catalytic converters or both SCR catalytic converters can be designed as a heat exchange device. In the context of the invention, an SCR catalytic converter designed as a heat exchanger device is to be understood as a heat exchanger device which is provided with an SCR coating. The heat exchanger device and thus the respective SCR catalytic converter can be flowed through in particular by an air flow and thereby be cooled in order to avoid excessive temperatures.

It has also proved to be particularly advantageous if the exhaust system has at least one ammonia slip catalyst (ASC), wherein the ammonia slip catalyst is also referred to as an ammonia barrier catalyst. The ammonia slip catalyst (ASC) is arranged downstream of the second SCR catalyst and thus downstream of the first SCR catalyst in the direction of flow of the exhaust gas flowing through the exhaust system and can be flowed through by the exhaust gas like the SCR catalytic converters. By means of the ammonia slip catalyst, unused reducing agent which has, for example, flowed through the SCR catalytic converters or through at least one of the SCR catalytic converters and has not participated in the SCR, can be transformed, i.e, converted, into nitrogen and water. In this way, excessive emissions of unused reducing agent can be avoided.

Here, it has proved to be particularly advantageous if a distance between the second SCR catalytic converter, in particular between an outlet or outlet surface of the second SCR catalytic converter, and the ammonia slip catalyst, in particular an inlet or inlet surface of the ammonia slip catalyst, is greater than 30 centimeters, in particular greater than 50 centimeters, in particular in relation to the direction of flow of the exhaust gas. It is provided, for example, that the second SCR catalytic converter, in particular its catalytically effective coating for SCR, ends at the outlet surface or at the outlet. It is also provided, for example, that the ammonia slip catalyst, in particular its catalytically effective coating of the ammonia slip catalyst for the conversion of unused reducing agent, in particular in relation to the flow direction of the exhaust gas, begins at the inlet or at the inlet surface.

In this respect, the invention is further based on the finding that a desired conversion of unused and thus excess reducing agent or ammonia by the ASC into nitrogen and water only takes place within a very narrow temperature range, which, for example, extends from 150 degrees Celsius to 200 degrees Celsius and optimally from 200 degrees Celsius to 250 degrees Celsius. At higher temperatures, oxidation takes place in nitrogen oxide. It therefore makes sense to operate the ASC at a lower temperature level than the second SCR catalytic converter, which finally causes reducing agent or ammonia slip. As a difference or temperature difference between the second SCR catalytic converter and the ASC, at least 50 degrees Celsius, in particular at least 100 degrees Celsius, is advantageous, in particular at the above-mentioned rated power point. In other words, it is preferably provided that a difference between the second temperature of the second SCR catalytic converter and a third temperature of the ammonia slip catalyst, in particular at the rated power point, is at least 50 degrees Celsius, preferably at least 100 degrees Celsius. In particular, it is conceivable that the ammonia slip catalytic converter is integrated into a rear muffler of the exhaust system, in order to thereby arrange the ammonia slip catalyst particularly far away from the internal combustion engine.

In order to be able to operate the ammonia slip catalyst at a temperature level that is at least 50 degrees, in particular at least 100 degrees, lower than that of the second SCR catalytic converter or the second temperature, it is advisable to aim for the ammonia slip catalytic converter to be positioned as far away as possible. Here, preferably the distance between the ASC and the second SCR catalytic converter is at least 30 centimeters, preferably at least 50 centimeters. This arrangement allows a lower temperature level to be depicted on the ASC compared to the second SCR catalytic converter. The risk of an undesired oxidation of ammonia to nitrogen oxide on the ASC can thus be kept particularly low. Alternatively or additionally, the ASC can be cooled by at least one, in particular switchable, cooling device. The cooling device of the ASC and thus the ammonia slip catalyst can be flowed through, for example, by a cooling medium, in particular a cooling liquid, whereby, for example, the temperature level at the ASC can be adjusted advantageously. By way of example, an air flow can be directed past the ASC via a flap or shutter, which is in particular switchable, such that the ASC can be supplied with the aforementioned air flow as required. This cools the ASC, which is particularly advantageous with temperatures at the ASC of more than 300 degrees Celsius.

Overall, it is provided, for example, that, depending on the prevailing temperatures of the SCR catalytic converters according to the present raw nitrogen oxide emissions, the total quantity of the reducing agent required for denitrification of the exhaust gas, particularly taking into account the exhaust gas recirculation rate, is distributed to the dosing elements and thus to the injection points and the SCR catalytic converters in such a way that optimum emission reduction takes place with minimum reducing agent consumption. Alternatively or additionally, the temperature of the second SCR catalytic converter can be optimally adjusted via switchable cooling measures. By way of example, the second SCR catalytic converter can be supplied with a targeted air flow via a switchable flap or shutter to cool the second SCR catalytic converter as required. This is particularly advantageous at temperatures of more than 400 degrees Celsius at the second SCR catalytic converter.

For further illustration, the following example shall be used: by way of example, from an average temperature of more than 400 degrees Celsius, preferably more than 450 degrees Celsius, at the first SCR catalytic converter near the engine, it is possible to switch over to the second SCR catalytic converter, i.e, to the second dosing element assigned to it, in particular if the average temperature of the second SCR catalytic converter is more than 250 degrees Celsius. This changeover is to be understood as the first operating mode belonging to the first time period, in which the total quantity is introduced into the exhaust gas exclusively be means of the second dosing element, but not by means of the first dosing element. This changeover can take place digitally or linearly, for example by means of a temperature-dependent ramp. In the case of high exhaust gas mass flows, such as those occurring at more than 60 percent of the full load of the internally combustion engine, the reducing agent can additionally be introduced into the exhaust gas by means of the first dosing element, in particular if the total quantity of reducing agent required to denitrify the exhaust gas is so large due to high raw nitrogen oxide emissions, if it can no longer be introduced into the exhaust gas in a sufficiently short time via the second dosing element alone.

Further advantages, features and details of the invention arise from the following description of a preferred exemplary embodiment as well as in the drawing. The features and combinations of features mentioned above in the description as well as the features and combinations of features mentioned in the following FIGURE description and/or shown alone in the single FIGURE can be used not only in the combination indicated in each case, but also in other combinations or alone without leaving the scope of the invention.

BRIEF DESCRIPTION OF THE DRAWINGS

In the single FIGURE, the drawing shows a schematic representation of an exhaust system designed to carry out a method in accordance with the invention, in particular of a motor

DETAILED DESCRIPTION OF THE DRAWINGS

The single FIGURE shows, in a schematic depiction, an exhaust system 10 for a motor vehicle, in particular for an automobile. In its completely manufactured state, the motor vehicle comprises the exhaust system 10 and an internal combustion engine, also referred to as combustion motor, by means of which the motor vehicle can be driven. During a fired operation of the internal combustion engine, the latter provides exhaust gas which—as illustrated by an arrow 12 in the FIGURE—flows into the exhaust system 10 and can flow through the exhaust system 10. The exhaust system 10 comprises a first SCR catalyst 14 for effecting or supporting the selective catalyst reduction (SCR). The exhaust system also comprises a second SCR catalytic converter 16, which is arranged downstream of the first SCR catalytic converter 14 in the direction of flow of the exhaust gas flowing through the exhaust system 10. The SCR can also be catalytically supported or effected by means of the second SCR catalytic converter 16. For catalytically effecting or supporting the SCR, the respective SCR catalytic converter 14 or 16 has at least one coating which is catalytically active for the SCR, such that the SCR can occur or take place in the respective SCR catalytic converter 14 or 16. In the scope of the SCR, any nitrogen oxides (NOx) contained in the exhaust gas react with ammonia (NH3), which originates from a reducing agent that is or was introduced into the exhaust gas, to form nitrogen and water, such that the nitrogen oxides contained in the exhaust gas are at least partially removed from the exhaust gas. This is also referred to as denitrification of the exhaust gas.

The exhaust system 10 comprises a dosing system, designated in its entirety as 18, by means of which, for example, within the scope of a respective introduction process, an advantageous or, in particular, at least necessary quantity of the reducing agent for denitrification of the exhaust gas can be or is introduced into the exhaust gas. For this purpose, the dosing system 18 comprises a first dosing element 20, by means of which the reducing agent can be introduced into the exhaust gas, in particular in the course of the respective introduction process, at at least one first introduction point E1. The introduction of the reducing agent into the exhaust gas is also referred to as dosing or metering. The dosing system 18 further comprises a second dosing element 22, which is arranged, for example, downstream of the first dosing element 20. By means of the second dosing element 22, the reducing agent can be introduced, in particular injected, into the exhaust gas at a second introduction point E2. It can be seen from the FIGURE that the first introduction point E1 is arranged upstream of the SCR catalytic converter 14, wherein the second introduction point E2 is arranged downstream of the SCR catalytic converter 14 and upstream of the SCR catalytic converter 16.

In the exemplary embodiment illustrated in the FIGURE, the exhaust system 10 also comprises a particulate filter 24, which is designed as a diesel particulate filter (DPF), in particular if the internal combustion engine is designed as a diesel engine. The particulate filter 24 is arranged upstream of the SCR catalytic converter 14. In particular, for example, the particulate filter 14 has a coating which is catalytically effective for the SCR, such that, for example, the particulate filter 24 is designed as an SCR particulate filter, in particular as an SCR diesel particulate filter (SDPF). Thus, for example, the particulate filter 24 also represents an SCR catalytic converter or a catalytic element which is catalytically effective for the SCR. The introduction point E1 is also arranged upstream of the particulate filter 24.

The exhaust system 10 also comprises an exhaust gas aftertreatment element 26, which is arranged upstream of the introduction point E1 and thus upstream of the SCR catalytic converter 14 and upstream of the particulate filter 24. The exhaust gas aftertreatment element 26 is designed, for example, as an oxidation catalytic converter or comprises such an oxidation catalytic converter, wherein the oxidation catalytic converter is designed as a diesel oxidation catalytic converter (DOC), in particular when the internal combustion engine is designed as a diesel engine. Alternatively or additionally, the exhaust gas aftertreatment element 26 is designed as a nitrogen oxide storage catalyst (NSK) or a passive nitrogen oxide absorber (PNA) or comprises such a nitrogen oxide storage catalyst or passive nitrogen oxide absorber. In particular, nitrogen oxides from the exhaust gas can be captured and stored by means of the nitrogen oxide storage catalyst or the passive nitrogen oxide absorber.

The exhaust system 10 also has an exhaust gas recirculation device 28, by means of which low-pressure exhaust gas recirculation (LP EGR) can be carried out. By means of the exhaust gas recirculation device 28, at least a part of the exhaust gas flowing through the exhaust system 10 or an exhaust pipe 30 of the exhaust system 10 can be branched off from the exhaust system 10 or from the exhaust pipe 30 and recirculated to the internal combustion engine. By means of the exhaust gas recirculation device 28, at least the part of the exhaust gas can be branched off from the exhaust pipe 30 at a branching point A, wherein the branching point A is arranged downstream of the SCR catalytic converter 14 and upstream of the SCR catalytic converter 16 and is thereby arranged closer to the SCR catalytic converter 14 than to the SCR catalytic converter 16. The exhaust gas recirculation device 28 comprises a valve element 32, for example designed as a flap, by means of which a quantity of the exhaust gas to be recirculated and thus a so-called exhaust gas recirculation rate (EGR rate) can be set.

In addition, the exhaust system 10 includes an ammonia slip catalyst 34, which is also referred to as ASC or ammonia trap catalyst. The ASC is arranged downstream of the second SCR catalyst 16. In the FIGURE, an arrow 36 illustrates a so-called ammonia or reducing agent slip, which is also referred to as slip quantity. The reducing agent or ammonia slip is formed by unused ammonia resulting from the reducing agent which is or was introduced into the exhaust gas and which has flowed through at least one of the SCR catalytic converters 14 and 16 but did not participate in the SCR and therefore was not used. In other words, the reducing agent or ammonia slip, which is also simply referred to as slip, comprises unused reducing agent or unused ammonia which has passed through at least one of the SCR catalysts 14 and 16 but has not participated in the SCR.

To avoid excessive emissions of unused reducing agent or ammonia, the reducing agent or ammonia slip, i.e, the reducing agent or ammonia forming the slip, is converted into nitrogen and water in the ASC or by means of the ASC. In the following, a method is described using the only FIGURE, by means of which the exhaust system 10 is operated and a particularly low-emission operation can be implemented.

In the method, for example, the total quantity of the reducing agent to be introduced into the exhaust gas flowing through the exhaust system 10, in particular in the course of a respective introduction process, by means of the dosing system 18 and necessary or advantageous for the denitrification of the exhaust gas, is divided between the dosing elements 20 and 22 and thus between the introduction points E1 and E2, such that respective quantities of the reducing agent to be introduced into the exhaust gas by means of the dosing elements 20 and 22, in particular by means of an electronic computing device not depicted in the FIGURE, are set or varied, wherein the quantities add up to the total quantity and, for example, are to be or are introduced into the exhaust gas by means of the dosing elements 20 and 22 within the framework of the respective introduction process.

In the method, it is provided that the respective quantity of reducing agent to be introduced into the exhaust gas by means of the respective doing element 20 or 22, in particular in the course of the respective introduction process, is adjusted depending on at least a first temperature of the first SCR catalytic converter 14. The first temperature is measured, for example, by means of at least one first temperature sensor not depicted in the FIGURE and/or calculated by means of a calculation model.

Furthermore, it is provided in the method that, during a period of time in which the first temperature exceeds a predeterminable first threshold value and at least one second temperature of the second SCR catalytic converter 16 exceeds a predeterminable second threshold value which is lower than the first threshold value and, for example, falls below the first threshold value, the introduction of the reducing agent or of the total quantity of the reducing agent into the exhaust gas takes place exclusively via the second dosing element 22 with respect to the dosing elements 20 and 22, such that during the period of time, no introduction of the reducing agent or of the total quantity of or part of the total quantity into the exhaust gas which is effected by means of the first dosing element 20 takes place. The second temperature is detected, for example, by means of at least one second temperature sensor and/or calculated by means of a calculation model.

In other words, when the first temperature exceeds the predeterminable or predetermined first threshold value and the second temperature is greater than the predeterminable or predetermined second threshold value and, for example, is lower than the first threshold value, the reducing agent is introduced into the exhaust gas exclusively via the second dosing element 22. In this way, for example, a nitrogen oxide conversion which does not take place or is only insufficient, which can be effected by means of the first SCR catalytic converter 14 and results, for example, from the first temperature exceeding the first threshold value, can be compensated for by means of the second SCR catalytic converter 16, such that the exhaust gas can be denitrified particularly advantageously. At the same time, the consumption of reducing agents can be kept within a particularly low range.

The first SCR catalytic converter 14, for example, is an SCR catalytic converter close to the engine, which is arranged substantially closer to the internal combustion engine than the second SCR catalytic converter 16. This is advantageous because the first SCR catalytic converter 14 can then be brought to a temperature that is advantageous for the conversion of nitrogen oxides particularly quickly. However, the SCR catalytic converter 14 can reach excessively high temperatures, such that it can only convert nitrogen oxides inadequately at such high temperatures. However, since the total quantity is then divided between dosing elements 20 and 22 in such a way that the total quantity is introduced into the exhaust gas exclusively by means of the dosing element 22 and not by means of the dosing element 20 during the respective introduction process, a sufficient nitrogen oxide conversion can be ensured by means of the SCR catalytic converter 16, such that excessive nitrogen oxide emissions can be avoided.

In order to avoid excessive reducing agent or ammonia slip, it is preferably provided that a distance B between the SCR catalytic converter 16, in particular between its outlet, is greater than 30 centimeters, in particular greater than 50 centimeters. Thus, for example, at the nominal power point of the internal combustion engine, a difference between the second temperature and a third temperature of the ASC is at least 50 degrees, in particular at least 100 degrees, whereby an excessive ammonia slip can be particularly advantageously avoided.

REFERENCE NUMERAL LIST

10 exhaust system
12 arrow
14 first SCR catalytic converter
16 second SCR catalytic converter
18 dosing system
20 first dosing element
22 second dosing element
24 particulate filter
26 exhaust gas aftertreatment element
28 exhaust gas recirculation device
30 exhaust pipe
32 valve element
34 ammonia slip catalyst
36 arrow A branching point
B distance
E1 first introduction point
E2 second introduction point

The invention claimed is:

1. A method for operating an exhaust system (10) through which exhaust gas from an internal combustion engine is flowable, wherein the exhaust system has a first selective catalytic reduction (SCR) catalytic converter (14) close to the internal combustion engine, a second SCR catalytic converter (16) arranged downstream of the first SCR catalytic converter (14), a first dosing element via which a reducing agent is introducible into the exhaust gas at a first introduction point (E1) disposed upstream of the first SCR catalytic converter (14), a second dosing element (22) via which the reducing agent s introducible into the exhaust gas a second introduction point (E2) disposed downstream of the first SCR catalytic converter (14) and upstream of the second SCR catalytic converter (16), the method comprising:
a respective quantity of the reducing agent to be introduced into the exhaust gas by a respective dosing element (20, 22) is set depending on at least a first temperature of the first SCR catalytic converter (14), wherein during a period of time during which the first temperature exceeds a predeterminable first threshold value and at least a second temperature of the second SCR catalytic converter (16) exceeds a predeterminable second threshold value, which is lower than the first threshold value, the introduction of the reducing agent into the exhaust gas with regard to the dosing elements (20, 22) takes place exclusively via the second dosing element (22), such that during the period of time, no introduction, which is caused by the first dosing element (20), of the reducing agent into the exhaust gas takes place;
wherein from an average first temperature of more than 400 degrees Celsius at the first SCR catalytic converter, the system switches over to the second SCR catalytic converter and to the second dosing element assigned to it;
wherein during the period of time, the second temperature is lower than the first threshold value and the first threshold value is 450 degrees Celsius and the second threshold value is 250 degrees Celsius.

2. The method according to claim 1, wherein during the period of time, a mass flow of the exhaust gas falls below a predeterminable third threshold value.

3. The method according to claim 2, wherein during a second period of time, during which the first temperature exceeds the first threshold value, the second temperature exceeds the second threshold value and the mass flow of the exhaust gas exceeds the third threshold value, the introduction of reducing agent into the exhaust gas takes place via both dosing elements (20, 22).

4. The method according to claim 3, wherein during a third period of time, during which the first temperature exceeds a predeterminable fourth threshold value, which is lower than the first threshold value, and falls below the first threshold and the second temperature falls below the second threshold value, the introduction of the reducing agent into the exhaust gas takes place via both dosing elements (20, 22).

5. The method according to claim 4, wherein during the third period of time, the quantity introduced into the exhaust gas by the first dosing element (20) is greater than the quantity introduced into the exhaust gas by the second dosing element (22).

6. The method according to claim 5, wherein a ratio of the amount introduced into the exhaust gas by the first dosing element (20) to the amount introduced into the exhaust gas by the second dosing element (22) is in a range of from 7/3 to 8/2 inclusive.

7. The method according to claim 4, wherein during a fourth period of time, during which the first temperature falls below the first threshold value and the second temperature exceeds the second threshold value, the introduction of the reducing agent into the exhaust gas takes place via both dosing elements (20, 22), wherein, during the fourth period of time, the quantity introduced into the exhaust gas by the first dosing element (20) is less than the quantity introduced into the exhaust gas by the second dosing element (22).

* * * * *